US009117073B1

(12) United States Patent
Daue et al.

(10) Patent No.: US 9,117,073 B1
(45) Date of Patent: Aug. 25, 2015

(54) SECURE, CONTROLLED, AND AUTONOMOUS NETWORK PATH GENERATION

(71) Applicant: ManTech Mission, Cyber & Technology Solutions, Inc., Herndon, VA (US)

(72) Inventors: Matthias P. Daue, Crofton, MD (US); Aaron M. Carreras, Severn, MD (US); Douglas E. Albert, Elkridge, MD (US)

(73) Assignee: MANTECH ADVANCED SYSTEMS INTERNATIONAL, INC., Herndon, VA (US)

( * ) Notice: Subject to any disclaimer, the term of this patent is extended or adjusted under 35 U.S.C. 154(b) by 154 days.

(21) Appl. No.: 13/763,509

(22) Filed: Feb. 8, 2013

(51) Int. Cl.
*G06F 11/00* (2006.01)
*G06F 21/55* (2013.01)

(52) U.S. Cl.
CPC ...................................... *G06F 21/55* (2013.01)

(58) Field of Classification Search
CPC ............ H04L 63/1416; H04L 63/1408; H04L 63/1441
USPC .................... 726/23, 11; 713/168; 709/59, 60
See application file for complete search history.

(56) References Cited

U.S. PATENT DOCUMENTS

| 6,266,704 | B1 | 7/2001 | Reed et al. | |
| 6,795,555 | B1* | 9/2004 | Parisien et al. | 380/47 |
| 6,807,169 | B2* | 10/2004 | Mattathil | 370/352 |
| 7,031,321 | B2 | 4/2006 | Habetha | |
| 7,234,059 | B1 | 6/2007 | Beaver et al. | |
| 7,246,231 | B2 | 7/2007 | Tariq et al. | |
| 7,739,497 | B1 | 6/2010 | Fink et al. | |
| 7,916,739 | B2 | 3/2011 | Trostle et al. | |
| 2005/0172120 | A1* | 8/2005 | Wang et al. | 713/160 |
| 2009/0248848 | A1* | 10/2009 | Jeong et al. | 709/223 |
| 2013/0031358 | A1* | 1/2013 | Holland et al. | 713/153 |

OTHER PUBLICATIONS

Syverson, Paul, "A Peel of Onion", ACSAC '11, pp. 123-135, Dec. 5-9, 2011, Orlando, Florida USA 2011 ACM 978-1-4503-0672-0/11/12.

* cited by examiner

*Primary Examiner* — Ali Abyaneh
(74) *Attorney, Agent, or Firm* — The Marbury Law Group, PLLC

(57) ABSTRACT

In systems and methods of network path generation, instructions are transferred from a first network node to a second network node instructing the second network node to establish a first secure communication link with the first network node. According to the instructions, instructions are transferred from the second network node to a third network node instructing the third network node to establish a second secure communication link with the second network node. Within the first secure communication link and the second communication link, a third secure communication link between the first network node and the third network node is established.

18 Claims, 7 Drawing Sheets

SECURE, CONTROLLED, AND AUTONOMOUS NETWORK PATH GENERATION

TECHNICAL BACKGROUND

The development of computer networks and internetworks has enabled rapid communication and information exchange on a global scale. At the same time, it has become increasingly difficult and more expensive to remain anonymous on communication networks. The technical and financial burden of supporting a non-attributable computer network is high. Further, even when a non-attributable network is maintained, the non-attributable network may have an attributable network point of origin, obviating the effectiveness of the non-attributable network.

OVERVIEW

In operation, instructions are transferred from a first network element to a second network element instructing the second network element to establish a first secure communication link with the first network element. According to the instructions, instructions are transferred from the second network element to a third network element instructing the third network element to establish a second secure communication link with the second network element. Within the first secure communication link and the second communication link, a third secure communication link between the first network element and the third network element is established.

DETAILED DESCRIPTION

Figure 1:
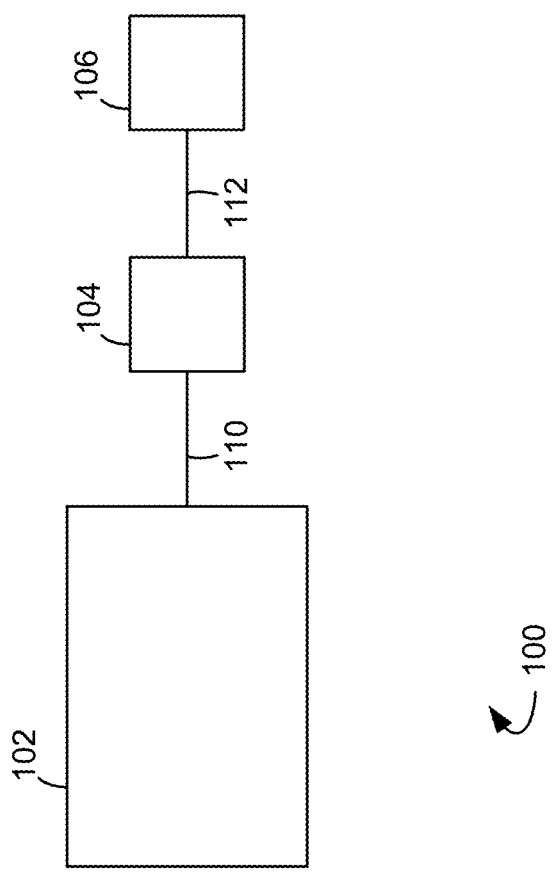
FIG. 1 illustrates an exemplary communication system for network path generation.

FIG. 1 illustrates an exemplary communication system 100 for network path generation comprising controller node 102, network node 104, and network node 106. Controller node 102 is a network element which can comprise a processor and associated circuitry to execute or direct the execution of computer-readable instructions. The computer-readable instructions can comprise instructions for network path generation. Controller node 102 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 102 can generate, store, retrieve, and send computer-readable instructions for the generation of a network path. Controller node 102 can receive instructions and other input at a user interface. Examples of controller node 102 can include a standalone computing device, a computer system, or a network component, and can be accessible, for example, by a wired or wireless connection, or through an indirect connection such as through a computer network or communication network. The functionality of controller node 102 can also be combined with or included in another network element, or distributed over two or more network elements.

Network node 104 is a network element in communication with controller node 102. Network node 104 can comprise a processor and associated circuitry to execute or direct the execution of computer-readable instructions, which can comprise instructions for network path generation. Network node 104 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Network node 104 can communicate with controller node 102 over communication link 110. Network node 104 can also communicate with second network node 106 over communication link 112. Examples of network node 104 can include a standalone computing device, a computer system, or a network component, and can be accessible, for example, by a wired or wireless connection, or through an indirect connection such as through a computer network or communication network, for example, communication links 110 and 112. Network node 106 is analogous to network node 104. Network node 106 can communicate with network node 104 over communication link 112.

Communication links 110 and 112 can be wired or wireless communication links. Wired communication links can be, for example, twisted pair cable, coaxial cable or fiber optic cable, or combinations thereof. Wireless communication links can be a radio frequency, microwave, infrared, or other similar signal.

Controller node 102 and network nodes 104 and 106 can be network elements in a communication network. The communication network can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Wired network protocols that may be utilized by the communication network comprise Transfer Control Protocol (TCP), Internet Protocol (IP), Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). The communication network may also comprise a wireless network, including base stations, wireless communication nodes, telephony switches, internet routers, network gateways, computer systems, communication links, or some other type of communication equipment, and combinations thereof. Wireless network protocols that may be utilized by the communication network may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). The communication network may also comprise combinations of the foregoing. Other network elements may be present in the communication network which are omitted for clarity, including additional processing nodes, routers, gateways, and physical and/or wireless data links, and in the case of wireless communications systems may further include base stations, base station controllers, gateways, call controllers, and location registers such as a home location register or visitor location register.

In operation, controller node 102 transfers instructions to network node 104 over communication link 110. The instructions can instruct the network node 104 to establish a secure communication link with controller node 102 over communication link 110. The instructions transferred to network node 104 can also instruct network node 104 to transfer instructions to network node 106. The instructions transferred to network node 106 can instruct network node 106 to establish a secure communication link with the network node 104 over communication link 112. A secure communication link can then be established from controller node 102 to network node 106, within the secure communication link between controller node 102 and network node 104, and within the secure communication link between network node 104 and network node 106.

Figure 2:
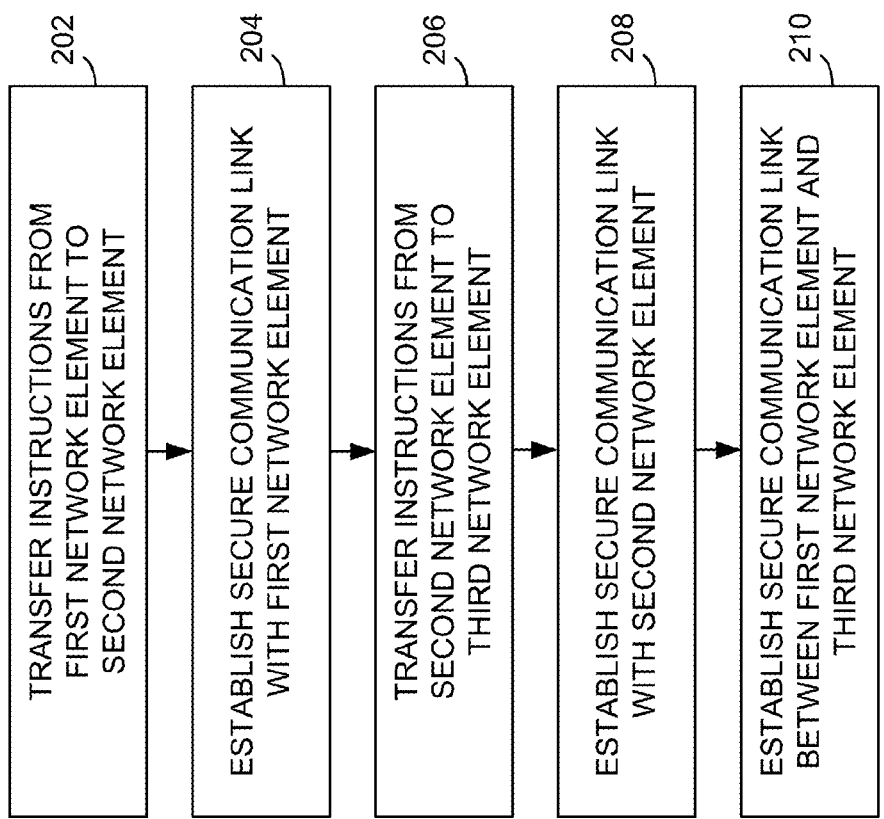
FIG. 2 illustrates an exemplary method of network path generation.

FIG. 2 illustrates an exemplary method of network path generation. In operation 202, instructions are transferred from a first network element to a second network element to establish a secure communication link with the first network element. For example, instructions can be transferred from controller node 102 to network node 104 over communication link 110. The instructions can instruct network node 104 to establish a secure communication link with controller node 102. The instructions can comprise computer software in a format which network node 104 is capable of receiving and executing, such as a script or other computer-executable code. The secure communication link can comprise, for example, a virtual private network (VPN) connection, a secure tunnel, or other similar secure communication link between network node 104 and controller node 102. Network node 104 can receive the instructions from controller node 102 and, according to the instructions, can establish a secure communication link with controller node 102 (operation 204).

In operation 206, instructions are transferred from the second network element to a third network element to establish a secure communication link with the second network element. For example, instructions can be transferred from network node 104 to network node 104 over communication link 112. The instructions can instruct network node 106 to establish a secure communication link with network node 104. The instructions can comprise computer software in a format which network node 106 is capable of receiving and executing, such as a script or other computer-executable code. The secure communication link can comprise, for example, a virtual private network (VPN) connection, a secure tunnel, or other similar secure communication link between network node 104 and network node 106. Network node 106 can receive the instructions from network node 104 and, according to the instructions, can establish a secure communication link with network node 104 (operation 208).

In operation 210, a secure communication link is established between the first network element and the third network element. For example, a secure communication link can be established between controller node 102 and network node 106 within the secure communication links between controller node 102 and network node 104, and between network node 104 and network node 106. In an embodiment, the instructions received by network node 106 can instruct network node to establish a secure communication link with controller node 102 when the secure communication link with controller node 104 is established. The secure communication link between controller node 102 and network node 106 can comprise, for example, a virtual private network (VPN) connection, a secure tunnel, or other similar secure communication link between controller node 102 and network node 106.

Establishing a secure communication link between controller node 102 and network node 106, within the secure communication links between controller node 102 and network node 104, and between network node 104 and network node 106, can serve to protect information communicated along the network path between controller node 102 and network node 106 by two layers of encryption, a first layer between the network elements, and a second layer from controller node 102 to network node 106. In addition, the secure communication link between controller node 102 and network node 106 can permit information transmitted over the communication link to behave as if information sent from controller node 102 traverses a single network hop from controller node 102 to network node 106.

In an embodiment, at least a portion of the instructions received from controller node 102 can be deleted by network node 104 when the first secure communication link is established between controller node 102 and network node 104. In addition, at least a portion of the instructions received from network node 104 can be deleted by network node 106 when the second secure communication link is established between network node 104 and network node 106. Where needed, instructions related to the maintenance of a secure communication link can be retained on a network node. In an embodiment, when a secure communication link is terminated, any remaining instructions can be deleted from a network node, for example, according to the instructions.

In an embodiment, the second network element is randomly selected by the first network element, and the third network element is randomly selected by the second network element. For example, network node 104 can be randomly selected by controller node 102 from among a plurality of network nodes. In addition, network node 106 can be randomly selected by network node 104 according to the instructions transferred from controller node 102. The plurality of network nodes can be, for example, a plurality of network nodes in a designated network domain, or it can be in a specified geographic location or region.

Figure 3:
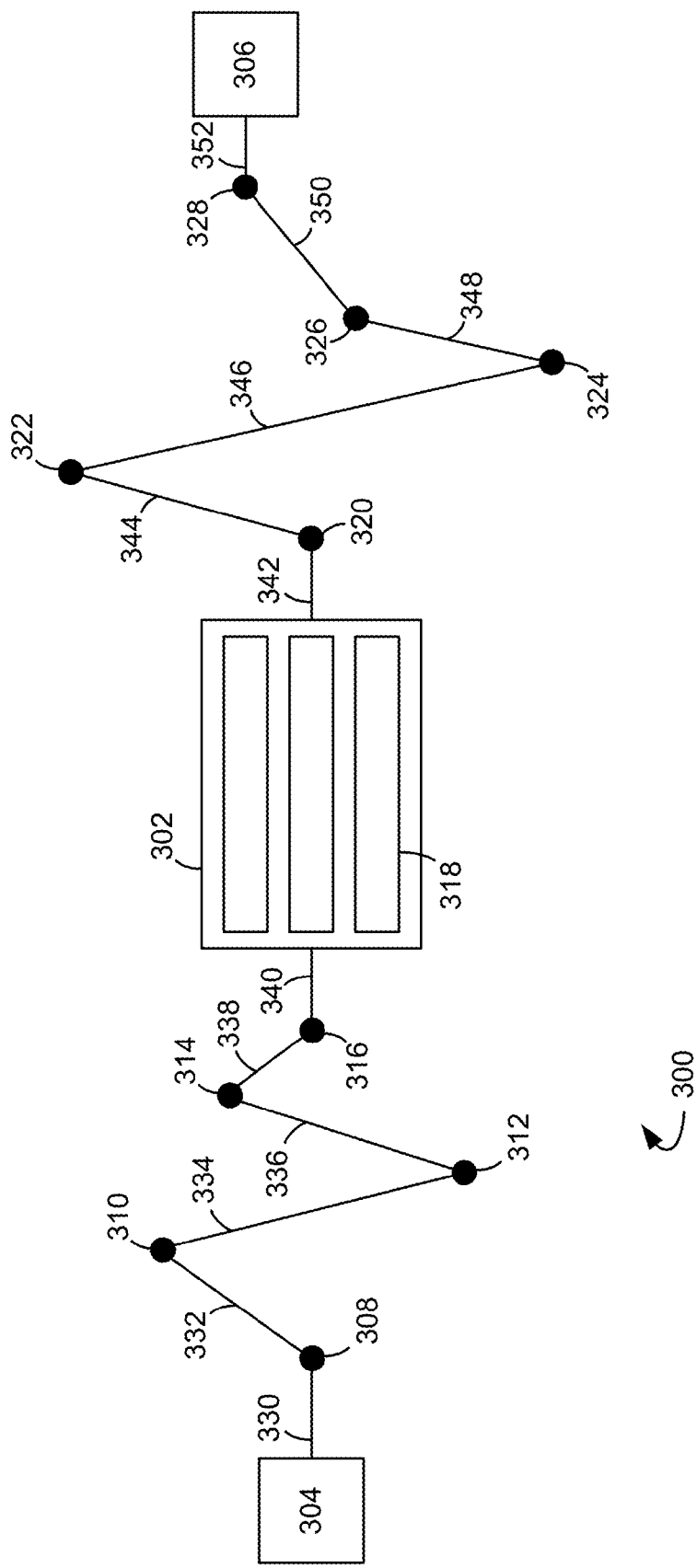
FIG. 3 illustrates another exemplary communication system for network path generation.

FIG. 3 illustrates another exemplary communication system 300 for network path generation comprising controller node 302, source 304, target 306, and network nodes 308, 310, 312, 314, 316, 320, 322, 324, 326 and 328.

Controller node 302 is a network element which can comprise a processor and associated circuitry to execute or direct the execution of computer-readable instructions. The computer-readable instructions can comprise instructions for network path generation. Controller node 302 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 302 can generate, store, retrieve, and send computer-readable instructions for the generation of a network path. Controller node 302 can receive instructions and other input at a user interface. Examples of controller node 302 can include a standalone computing device, a computer system, or a network component, and can be accessible, for example, by a wired or wireless connection, or through an indirect connection such as through a computer network or communication network. The functionality of controller node 302 can also be combined with or included in another network element, or it can be distributed across two or more network elements.

Controller node 302 comprises one or more user environments 318. A user environment can comprise a logical computing environment on controller node 302, for example, a virtual machine or other virtual computing environment instantiated on controller node 302. A user environment can further comprise one or more software tools and/or applications stored on and executed by controller node 302. The specific software tools and applications can be configured for user environment 318 as desired by controller node 302. In an embodiment, user environment 318 can be accessed by source 304 over a communication link, such as a network path. Source 304 can issue instructions to software tools or applications running in user environment 318 over the communication link. The software tools and applications can be used, for example, to observe target 306, to perform research on target 306, or to send instructions to target 306, over a communication link, such as another network path. In an embodiment, user environment 318 can comprise a managed network services architecture accessible by source 304. Performing research can comprise monitoring traffic to or from target 306, capturing traffic to or from target 306 (for example, making copies of information sent to or coming from target 306), sending instructions to target 306 (for example, introducing an exploit to target 306), determining vulnerabilities of target 306, mapping target 306 (for example, mapping ports of target 306, or mapping neighboring network elements of target 306), and so forth. Further, while controller node 302 can be in communication with other elements of a communication network, a network location of controller node 302 can be obfuscated, to make the network location of controller node 302 and/or information sent from controller node 302 non-attributable.

Controller node 302 can comprise a plurality of user environments 318. Each user environment 318 can be separately encrypted within controller node 302, to provide separately secured environments for software tools and applications. User environment 318 can be used to store files, enabling the storage by source 304 of files in a secure, encrypted and non-attributable storage location. User environment 318 can also be reverted to a stored state or a previous state, for example, an image, a snapshot, etc., to delete any files, programs, or other data or software from user environment 318.

Network nodes 308, 310, 312, 314, 316, 320, 322, 324, 326 and 328 comprise network elements of communication system 300, and can comprise a processor and associated circuitry to execute or direct the execution of computer-readable instructions, such as instructions for network path generation. Network nodes 308, 310, 312, 314, 316, 320, 322, 324, 326 and 328 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof.

Source 304 and target 306 are each a network element which can comprise a processor and associated circuitry to execute or direct the execution of computer-readable instructions. Source 304 and target 306 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Source 304 and target 306 can be for example, a standalone computing device or network element. Source 304 can communicate with network node 308 over communication link 330. Target 306 can communicate with network node 328 over communication link 352.

As illustrated in FIG. 3, each network element can communicate with neighboring network elements over a communication link. For example, network node 308 can communicate with source 304 over communication link 330 and with network node 310 over communication link 332; network node 310 can communicate with network node 308 over communication link 332 and with network node 312 over communication link 334; and so forth. Controller node 302 can communicate with network node 316 over communication link 340 and with network node 320 over communication link 342. Network node 328 can communicate with target 306 over communication link 352, as well as with network node 326 over communication link 350. Communication links 330, 332, 334, 336, 338, 340, 342, 344, 346, 348, 350 and 325 can be wired or wireless communication links. Wired communication links can be, for example, twisted pair cable, coaxial cable or fiber optic cable, or combinations thereof. Wireless communication links can be a radio frequency, microwave, infrared, or other similar signal.

Controller node 302, source 304, target 306, and network nodes 308-328 can comprise network elements in a communication network. The communication network can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Wired network protocols that may be utilized by communication network the comprise Transfer Control Protocol (TCP), Internet Protocol (IP), Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). The communication network may also comprise a wireless network, including base stations, wireless communication nodes, telephony switches, internet routers, network gateways, computer systems, communication links, or some other type of communication equipment, and combinations thereof. Wireless network protocols that may be utilized by the communication network may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). The communication network may also comprise combinations of the foregoing.

Other network elements may be present in communication system 300 which are omitted for clarity, including additional processing nodes, routers, gateways, and physical and/or wireless data links, and in the case of wireless communications systems may further include base stations, base station controllers, gateways, mobile switching centers, dispatch application processors, and location registers such as a home location register or visitor location register.

Controller node 302 can provide instructions for establishing an ingress network path and an egress network path. Controller node 302 can transfer instructions to network node 316 over communication link 340. The instructions can instruct network node 316 to establish a secure communication link with controller node 302. The instructions can comprise computer software in a format which network node 320 is capable of receiving and executing, such as a script or other computer-executable code. The secure communication link can comprise, for example, a virtual private network (VPN) connection, a secure tunnel, or other similar secure communication link between network node 316 and controller node 302. Network node 316 can receive the instructions from controller node 302 and, according to the instructions, can establish a secure communication link with controller node 302.

Network node 316 can transfer instructions to network node 314 over communication link 338. The instructions can instruct network node 314 to establish a secure communication link with network node 316. The instructions can comprise computer software in a format which network node 314 is capable of receiving and executing, such as a script or other computer-executable code. The secure communication link can comprise, for example, a virtual private network (VPN) connection, a secure tunnel, or other similar secure communication link between network node 314 and network node 316. Network node 314 can receive the instructions from network node 316 and, according to the instructions, can establish a secure communication link with network node 316. Similarly, network node 314 can provide instructions to network node 312 to establish a secure communication link with network node 314; network node 312 can provide instructions to network node 310 to establish a secure communication link with network node 312; and network node 310 can provide instructions to network node 308 to establish a secure communication link with network node 310.

A secure communication link can then be established between network node 308 and controller node 302 within the respective secure communication links between controller node 302 and network node 316, network nodes 316 and 314, network nodes 314 and 312, network nodes 312 and 310, and network nodes 310 and 308. The secure communication link between controller node 302 and network node 308 can comprise, for example, a virtual private network (VPN) connection, a secure tunnel, or other similar secure communication link between controller node 302 and network node 308. Establishing a secure communication link between controller node 302 and network node 308, within the secure communication links between the various intermediate network elements, can serve to protect information communicated along the network path between controller node 302 and network node 308 by two layers of encryption, a first layer between the network elements, and a second layer from controller node 302 and network node 308. In addition, the secure communication link between controller node 302 and network node 308 can permit information transmitted over the communication link to behave as if it traverses a single network hop from controller node 302 and network node 308, and vice versa. In an embodiment, the secure communication link between controller node 302 and network node 308, within the secure communication links established between the intermediate network elements, comprises an ingress communication link.

Network node 308 can comprise an ingress node, and source 304 can communicate with network node 308 to send and receive information to controller node 302 over the secure communication link between network node 308 and controller node 302. In an embodiment, when the secure communication link is established between controller node 302 and network node 308, a network address, such as an internet protocol (IP) address of network node 308 can be varied, for example, according to instructions from controller node 302. For example, a domain name service (DNS) pointer can be provided to source 304, and the DNS pointer can be associated with the network address of network node 308, for example, at a DNS server. An association between the network address of network node 308 and the DNS pointer (such as, for example, a DNS association resource record) can changed periodically to obscure the network address of network node 308.

Further, controller node 302 can provide instructions for establishing an egress network path. For example, controller node 302 can transfer instructions to network node 320 over communication link 342. The instructions can instruct network node 320 to establish a secure communication link with controller node 302. The instructions can comprise computer software in a format which network node 320 is capable of receiving and executing, such as a script or other computer-executable code. The secure communication link can comprise, for example, a virtual private network (VPN) connection, a secure tunnel, or other similar secure communication link between network node 320 and controller node 302. Network node 320 can receive the instructions from controller node 302 and, according to the instructions, can establish a secure communication link with controller node 302.

Network node 320 can transfer instructions to network node 322 over communication link 344. The instructions can instruct network node 322 to establish a secure communication link with network node 320. The instructions can comprise computer software in a format which network node 322 is capable of receiving and executing, such as a script or other computer-executable code. The secure communication link can comprise, for example, a virtual private network (VPN) connection, a secure tunnel, or other similar secure communication link between network node 322 and network node 320. Network node 322 can receive the instructions from network node 320 and, according to the instructions, can establish a secure communication link with network node 320. Similarly, network node 322 can provide instructions to network node 324 to establish a secure communication link with network node 322; network node 324 can provide instructions to network node 326 to establish a secure communication link with network node 324; and network node 326 can provide instructions to network node 328 to establish a secure communication link with network node 326.

A secure communication link can then be established between network node 328 and controller node 302 within the respective secure communication links between controller node 302 and network node 320, network nodes 320 and 322, network nodes 322 and 324, network nodes 324 and 326, and network nodes 326 and 328. The secure communication link between controller node 302 and network node 328 can comprise, for example, a virtual private network (VPN) connection, a secure tunnel, or other similar secure communication link between controller node 302 and network node 328. Establishing a secure communication link between controller node 302 and network node 328, within the secure communication links between the various intermediate network elements, can serve to protect information communicated along the network path between controller node 302 and network node 328 by two layers of encryption, a first layer between the network elements, and a second layer from controller node 302 and network node 328. In addition, the secure communication link between controller node 302 and network node 328 can permit information transmitted over the communication link to behave as if information traverses a single network hop from controller node 302 and network node 328, and vice versa. In an embodiment, the secure communication link between controller node 302 an network node 328, within the secure communication links established between the intermediate network elements, comprises an egress communication link. In an embodiment, network node 328 comprises an egress node.

In an embodiment, the instructions received at a network node can instruct the network node to perform at least one of several activities. For example, the instructions can instruct a network node to perform an update of its security software. The instructions can also instruct network node to install and/or update communication software, such as software enabling the establishment of a secure communication link. In an embodiment, the instructions can also indicate that a network node receiving the instructions is the last network node in a network path. For example, an element of the instructions can comprise a counter which can be incremented each time instructions are transferred to a network node, up to a maximum number indicating that the receiving network node is the last network node, and that the last network node should not select another network node nor transfer instructions to another network node.

In an embodiment, each network node can be randomly selected by the previous network element. A network node can be selected from within a designated network region. A network node can also be selected from a specified geographical region or country. In an embodiment, source 304 can provide an instruction selecting the designated network region or the selected geographical region or country. An instruction can also be provided specifically with regard to the selection of the egress node (e.g., network node 328), to particularly select the egress node from, for example, a designated network region, geographical area, or country. Traffic leaving network node 328 can thus appear to an observer as originating from the designated network region, geographical area, or country of the selected network node 328.

In an embodiment, instructions transferred to a network node can comprise a latency threshold which can be used to select a next network node. While network nodes can be selected from among any network node in a communication network or internetwork, the use of disparate network nodes can introduce latency into communication along a network path. The selection of a next network node by a network node, according to the instructions, can account for latency, such as by using a latency threshold to select the next network node. For example, a network node can measure network latency, such as by a ping or a probe, to estimate latency with a candidate network element. A network node can also use passive or indirect means, such as traffic sampling, to estimate latency with a candidate network element where measurement by a ping or probe may be undesirable, for example, to avoid sending detectable traffic from a network element.

In an embodiment, network nodes can comprise publicly available network nodes. An example of a publicly available network node can include a publicly available internet server. In such case, first secure communication links can be established between a plurality of publicly available network nodes, and a second secure communication link can be established within the first secure communication link from a first network endpoint to a second network endpoint. In an embodiment, each network node which receives instructions can be configured to function as an independent network node which comprises information related only to adjacent network nodes in the network path. This can permit the configuration of multiple independent and agnostic nodes that can be used to establish a secure, non-attributable, obfuscated network path, in which each node only knows about adjacent upstream and downstream nodes. In an embodiment, the received instructions can be a limited instruction set that permits the automatic configuration of base systems, drafted from among publicly available network nodes, such as cloud service providers or other providers of network-available computing resources and/or network nodes.

In an embodiment, periodically the secure communication links can be de-established, new network nodes can be selected, and new secure communication links can be established. For example, according to the instructions transferred to network nodes, at a predetermined time each network node can de-establish the secure communication link which had been established. The predetermined time can comprise a randomly determined time, which can be different each time an egress network path and/or an ingress network path is established.

Figure 4:
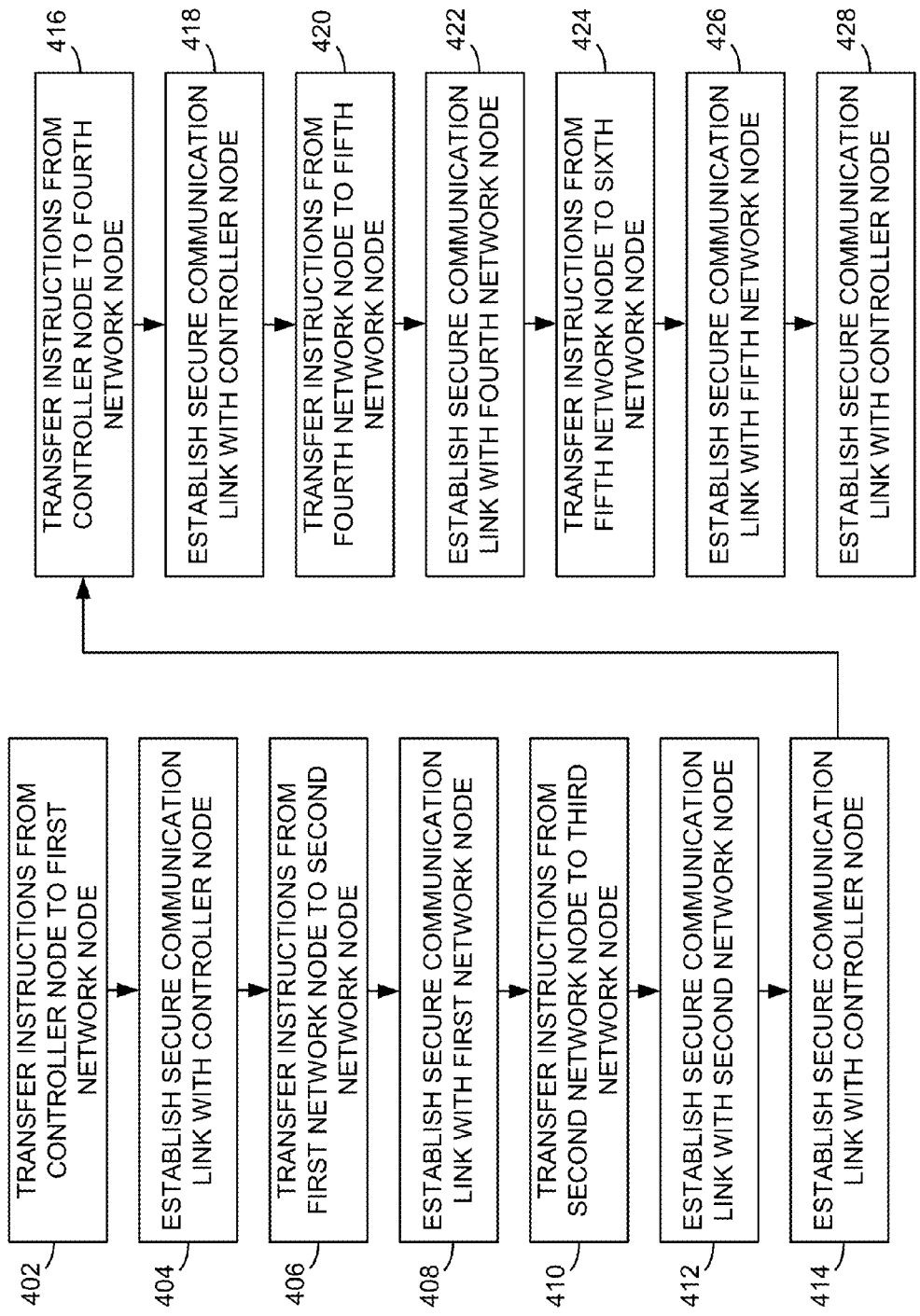
FIG. 4 illustrates another exemplary method of network path generation device.

FIG. 4 illustrates another exemplary method of network path generation. In operation 402, instructions are transferred from a controller node to a first network node to establish a secure communication link with the controller node. For example, instructions can be transferred from controller node 302 to network node 316 over communication link 340. The instructions can instruct network node 316 to establish a secure communication link with controller node 302. The instructions can comprise computer software in a format which network node 316 is capable of receiving and executing, such as a script or other computer-executable code. The secure network connection can comprise, for example, a virtual private network (VPN) connection, a secure tunnel, or other similar secure communication link between network node 316 and controller node 302. Network node 302 can receive the instructions from controller node 302 and, according to the instructions, can establish a secure communication link with controller node 302 (operation 404).

In operation 406, instructions are transferred from the first network node to a second network node to establish a secure communication link with the first network node. For example, instructions can be transferred from network node 316 to network node 314 over communication link 338. The instructions can instruct network node 314 to establish a secure communication link with network node 316. The instructions can comprise computer software in a format which network node 314 is capable of receiving and executing, such as a script or other computer-executable code. The secure communication link can comprise, for example, a virtual private network (VPN) connection, a secure tunnel, or other similar secure communication link between network node 316 and network node 314. Network node 314 can receive the instructions from network node 316 and, according to the instructions, can establish a secure communication link with network node 316 (operation 408).

In operation 410, instructions are transferred from the second network node to a third network node to establish a secure communication link with the second network node. For example, instructions can be transferred from network node 314 to network node 312 over communication link 336. The instructions can instruct network node 312 to establish a secure communication link with network node 314. The instructions can comprise computer software in a format which network node 312 is capable of receiving and executing, such as a script or other computer-executable code. The secure communication link can comprise, for example, a virtual private network (VPN) connection, a secure tunnel, or other similar secure communication link between network node 314 and network node 312. Network node 312 can receive the instructions from network node 314 and, according to the instructions, can establish a secure communication link with network node 314 (operation 412). FIG. 3 also illustrates network nodes 310 and 308. It will be appreciated that instructions can also be sent to network nodes 310 and 308, substantially as described above, and further description is omitted for conciseness. The number of network nodes in a network path is not limited to a particular number of network nodes, and can vary, for example, according to the instructions provided by controller node 302.

In operation 414, a secure communication link can be established between the last network node and the controller node. For example, a secure communication link can be established between the network node 308 and controller node 302 within the secure communication links between controller node 302 and network node 316; between network node 316 and network node 314; between network node 314 and network node 312; between network node 312 and network node 310; and between network node 310 and network node 308. For example, the instructions received by network node 308 can instruct network node 308 to establish a secure communication link with controller node 302 when the secure communication link with controller node 310 is established by network node 308. The secure communication link between controller node 102 and network node 104 can comprise, for example, a virtual private network (VPN) connection, a secure tunnel, or other similar secure communication link between controller node 102 and network node 106.

Establishing a secure communication link between controller node 302 and network node 308, within the secure communication links between controller node 302 and network node 316, between network node 316 and network node 314, between network node 314 and network node 312, between network node 312 and network node 310, and between network node 310 and network node 308, can serve to protect information communicated along the network path between controller node 302 and network node 308 by two layers of encryption, a first layer between the network elements, and a second layer from controller node 302 to network node 308. In addition, the secure communication link between controller node 302 and network node 308 can permit information transmitted over the communication link to behave as if it traverses a single network hop between controller node 302 to network node 308 (and vice versa). In an embodiment, the secure communication links established between each of the network elements 302, 316, 314, 312, 310 and 308, and the secure communication link established between network node 308 and controller node 302 within the secure communication links established between each of the network elements, comprises an ingress network path to controller node 302.

Continuing with FIG. 4, in operation 416, instructions are transferred from a controller node to a fourth network node to establish a secure communication link with the controller node. For example, instructions can be transferred from controller node 302 to network node 320 over communication link 342. The instructions can instruct network node 320 to establish a secure communication link with controller node 302. The instructions can comprise computer software in a format which network node 320 is capable of receiving and executing, such as a script or other computer-executable code. The secure network connection can comprise, for example, a virtual private network (VPN) connection, a secure tunnel, or other similar secure communication link between network node 320 and controller node 302. Network node 320 can receive the instructions from controller node 302 and, according to the instructions, can establish a secure communication link with controller node 302 (operation 418).

In operation 420, instructions are transferred from the fourth network node to a fifth network node to establish a secure communication link with the fourth network node. For example, instructions can be transferred from network node 320 to network node 322 over communication link 344. The instructions can instruct network node 322 to establish a secure communication link with network node 320. The instructions can comprise computer software in a format which network node 322 is capable of receiving and executing, such as a script or other computer-executable code. The secure communication link can comprise, for example, a virtual private network (VPN) connection, a secure tunnel, or other similar secure communication link between network node 322 and network node 320. Network node 322 can receive the instructions from network node 320 and, according to the instructions, can establish a secure communication link with network node 320 (operation 422).

In operation 424, instructions are transferred from the fifth network node to a sixth network node to establish a secure communication link with the fifth network node. For example, instructions can be transferred from network node 322 to network node 324 over communication link 346. The instructions can instruct network node 324 to establish a secure communication link with network node 322. The instructions can comprise computer software in a format which network node 324 is capable of receiving and executing, such as a script or other computer-executable code. The secure communication link can comprise, for example, a virtual private network (VPN) connection, a secure tunnel, or other similar secure communication link between network node 324 and network node 322. Network node 324 can receive the instructions from network node 322 and, according to the instructions, can establish a secure communication link with network node 322 (operation 426). FIG. 3 also illustrates network nodes 326 and 328. It will be appreciated that instructions can also be sent to network nodes 326 and 328, substantially as described above, and further description is omitted for conciseness. The number of network nodes in a communication path is not limited to a particular number of network nodes, and can vary, for example, according to the instructions provided by controller node 302.

In operation 428, a secure communication link can be established between the last network node and the controller node. For example, a secure communication link can be established between network node 328 and controller node 302 within the secure communication links between controller node 302 and network node 320; between network node 320 and network node 322; between network node 322 and network node 324; between network node 324 and network node 326; and between network node 326 and network node 328. For example, the instructions received by network node 328 can instruct network node 328 to establish a secure communication link with controller node 302 when the secure communication link with controller node 326 is established by network node 328. The secure communication link between controller node 302 and network node 328 can comprise, for example, a virtual private network (VPN) connection, a secure tunnel, or other similar secure communication link between controller node 302 and network node 328.

Establishing a secure communication link between controller node 302 and network node 328, within the secure communication links between controller node 302 and network node 320, between network node 320 and network node 322, between network node 322 and network node 324, between network node 324 and network node 326, and between network node 326 and network node 328, can serve to protect information communicated along the network path between controller node 302 and network node 328 by two layers of encryption, a first layer between the network elements, and a second layer from controller node 302 to network node 328. In addition, the secure communication link between controller node 302 and network node 328 can permit information transmitted over the communication link to behave as if it traverses a single network hop between controller node 302 to network node 328 (and vice versa). In an embodiment, the secure communication links established between each of the network elements 302, 320, 322, 324, 326, and 328, and the secure communication link established between network node 308 and controller node 302 within the secure communication links established between each of the network elements, comprises an egress network path from controller node 302.

Figure 5:
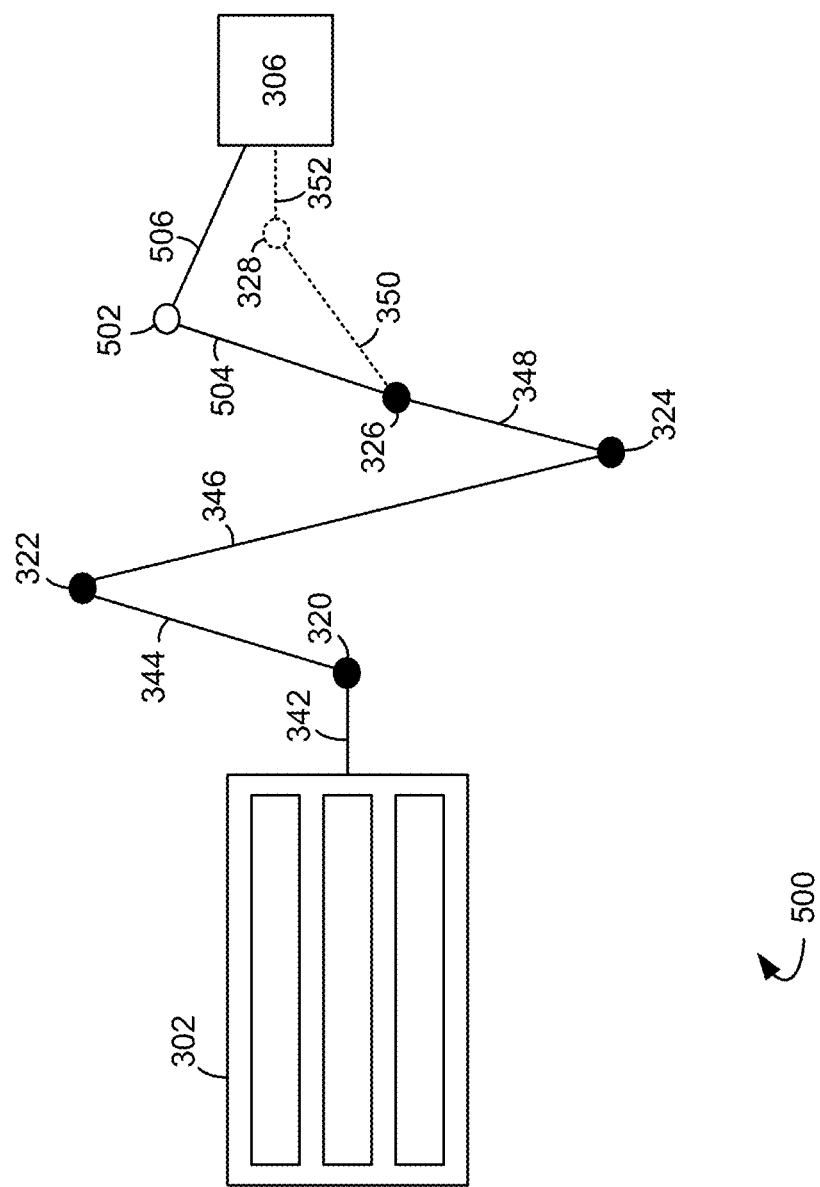
FIG. 5 illustrates another exemplary communication system for network path generation.

FIG. 5 illustrates another exemplary communication system 500 for network path generation. Communication system 500 includes controller node 302, network nodes 320, 322, 324, 326, 328, and 502, and communication links 342, 344, 346, 348, 350, 352, 504 and 506. Network node 502 is analogous to network nodes 320, 322, 324, 326, 328, and communication links 504 and 506 are analogous to communication links 342-352, which are described above in relation to FIG. 3.

In an embodiment, at least a portion of the instructions received from controller node 302 can be deleted by network nodes 320, 322, 324, 326 and 328 when a secure communication link is established between each network node and the network node from which instructions are received. Where needed or desired, instructions related to the maintenance of a secure communication link can be retained on a network node. In an embodiment, when a secure communication link is terminated, any remaining instructions can be deleted from a network node, for example, according to the instructions.

The instructions can also comprise instructions related to detecting a compromise at a network node. For example, when research is conducted on a target (such as target 306) along a network path, target 306 may become aware of the research. For example, when instructions are sent to target 306, they may be detected by target 306. Similarly, target 306 may detect the monitoring of information traffic to or from target 306. Other methods of detection by target 306 are also possible. When target 306 detects such activity, target 306 may attempt to discover the origin of the detected activity. For example, target 306 may attempt to monitor information traffic back through the network path to controller node 302. In other cases, target 306 may identify a network node in a communication path, and target 306 may attempt to monitor information traffic to and/or from the identified network node. Target 306 may also attempt to gain control of the identified network node. Target 306 may also attempt to introduce an exploit to the identified network node, or may attempt to establish a secure network communication link with the identified network node.

The instructions provided to a network node by the preceding network element can include instructions related to detecting a compromise at a network node. For example, network node 328 received instructions from network node 326, and established a secure communication link with network node 326. That is, network node 328 only communicates with network node 326, and does not communicate with other elements of the network path between controller node 302 and network node 328. Although a secure communication link is established between controller node 302 and network node 328 within the secure communication links between the intermediate network elements (such as between controller node 302 and network node 320, and between network nodes 320 and 322, network nodes 322 and 324, network nodes 324 and 326, and network nodes 326 and 328, respectively) network node 328 does not communicate with other network elements in the network path other than network node 326. Further, the network origin of information received from network node 302 along the secure network communication between controller node 302 and network node 328 can be obfuscated so that its network origin is not determinable. Additionally, information sent from network node 328 can be configured to indicate only that it is sent from network node 328, and thus network node 328 can appear to be the origin of information sent from network node 328. Thus, in the event that network node 328 were to be compromised, only the identity of network node 326 could potentially be learned from network node 328, and not the identity or network location of controller node 302, or any other network element along the network path. In an embodiment, each network node can be configured to operate as an independent node which comprises information related to only adjacent network nodes in a network path.

Further, according to the instructions on a network node, the network node can be monitored for an indication of intrusion. When an indication of intrusion is detected, the secure communication link between the network node and the previous network node from which the instructions were received can be de-established or terminated. When the previous network node determines that the communication link has been de-established, the previous network node can transfer instructions to a newly selected network node, and the newly selected network node can establish a secure communication link with the previous network node. For example, the instructions on network node 328 can instruct that an indication of intrusion be monitored. An indication of intrusion can comprise an attempt to establish a secure communication link with a network node by target 306; the receipt of a software exploit or similar instructions; detecting that network traffic of the network node is being monitored; detecting the manipulation of a file on the network node; detecting a change in a hash value of a file on the network node; detecting a denial of service attack on the network node; and the like. In an embodiment, when a network node detects an indication of intrusion, the network node can de-establish the secure communication link with the previous network node. In an embodiment, when a network node detects an indication of intrusion, the network node can delete any remaining instructions on the network node. In an embodiment, according to the instructions a network node can be reverted to a previous state (e.g., an image, a snapshot, etc.), to remove any trace of the instructions.

When a network node terminates a secure communication link, the other network node in communication with the network node can detect the termination of the secure communication link. For example, when network node 328 de-establishes secure communication link 350, the termination can be detected by network node 326. According to the instructions on detecting network node, the network node can select a new network node and can send instructions to the new network node to establish a communication link with the detecting network node. For example, when network node 326 detects the termination of secure communication link 350, network node 326 can select new network node 502, and can send instructions to network node 502 instructing network node 502 to establish a secure communication link with network node 326. When the secure communication link is established with network node 326, a secure communication link between network node 502 and controller node 302 can be established. Thereafter, research can be conducted on target 306 through network node 502 over communication link 506. In an embodiment, network node 502 can be randomly selected by network node 326 according to the instructions on network node 326. Network node 502 can be in a designated network domain, or it can be in a specified geographic location or region.

Figure 6:
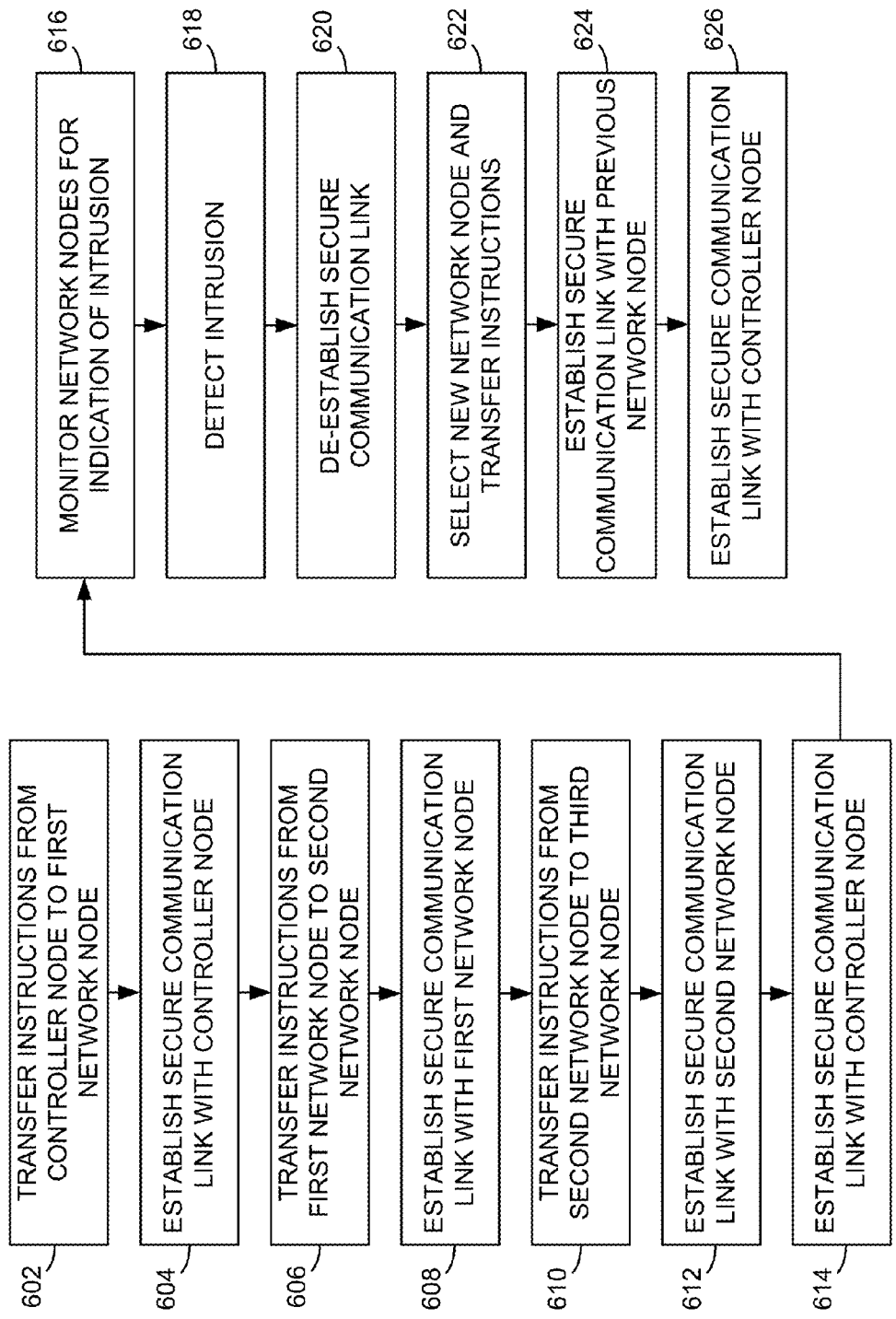
FIG. 6 illustrates another exemplary method of network path generation device.

FIG. 6 illustrates another exemplary method of network path generation device. In operation 602, instructions are transferred from a controller node to a first network node to establish a secure communication link with the controller node. For example, instructions can be transferred from controller node 302 to network node 320 over communication link 342. The instructions can instruct network node 320 to establish a secure communication link with controller node 302. The instructions can comprise computer software in a format which network node 320 is capable of receiving and executing, such as a script or other computer-executable code. The secure network connection can comprise, for example, a virtual private network (VPN) connection, a secure tunnel, or other similar secure communication link between network node 320 and controller node 302. Network node 302 can receive the instructions from controller node 302 and, according to the instructions, can establish a secure communication link with controller node 302 (operation 604).

In operation 606, instructions are transferred from the first network node to a second network node to establish a secure communication link with the first network node. For example, instructions can be transferred from network node 320 to network node 322 over communication link 344. The instructions can instruct network node 322 to establish a secure communication link with network node 320. The instructions can comprise computer software in a format which network node 322 is capable of receiving and executing, such as a script or other computer-executable code. The secure communication link can comprise, for example, a virtual private network (VPN) connection, a secure tunnel, or other similar secure communication link between network node 322 and network node 324. Network node 322 can receive the instructions from network node 320 and, according to the instructions, can establish a secure communication link with network node 320 (operation 608).

In operation 610, instructions are transferred from the second network node to a third network node to establish a secure communication link with the second network node. For example, instructions can be transferred from network node 322 to network node 324 over communication link 346. The instructions can instruct network node 324 to establish a secure communication link with network node 322. The instructions can comprise computer software in a format which network node 324 is capable of receiving and executing, such as a script or other computer-executable code. The secure communication link can comprise, for example, a virtual private network (VPN) connection, a secure tunnel, or other similar secure communication link between network node 324 and network node 322. Network node 324 can receive the instructions from network node 322 and, according to the instructions, can establish a secure communication link with network node 322 (operation 612). FIG. 3 also illustrates network nodes 326 and 328. It will be appreciated that instructions can also be sent to network nodes 326 and 328, substantially as described above, and further description is omitted for conciseness. The number of network nodes in a communication path is not limited to a particular number of network nodes, and can vary, for example, according to the instructions provided by controller node 302.

In operation 614, a secure communication link can be established between the last network node and the controller node. For example, a secure communication link can be established between the network node 328 and controller node 302 within the secure communication links between controller node 302 and network node 320; between network node 320 and network node 322; between network node 322 and network node 324; between network node 324 and network node 326; and between network node 326 and network node 328. For example, the instructions received by network node 328 can instruct network node 328 to establish a secure communication link with controller node 302 when the secure communication link with network node 326 is established by network node 328. The secure communication link between controller node 302 and network node 328 can comprise, for example, a virtual private network (VPN) connection, a secure tunnel, or other similar secure communication link between controller node 302 and network node 328.

In operation 616, the first, second and third network nodes can be monitored for an indication of intrusion. For example, the instructions on network nodes 320, 322, 324 326, and 328 can instruct that an indication of intrusion be monitored. An indication of intrusion can comprise an attempt to establish a secure communication link with a network node by target 306; the receipt of a software exploit or similar instructions; detecting that network traffic of the network node is being monitored; detecting the manipulation of a file on the network node; detecting a change in a hash value of a file on the network node; detecting a denial of service attack on the network node; and the like. When an indication of intrusion is detected, the secure communication link between the network node and the previous network node from which the instructions were received can be de-established. For example, an indication of intrusion can be detected at network node 328, and network node 328 can de-establish the secure communication link with network node 326 (operation 620). In an embodiment, when a network node detects an indication of intrusion, the network node can delete any remaining instructions on the network node, and/or can be reverted to a previous state such as an image or a snapshot.

In operation 622, when the previous network node determines that the communication link has been de-established, the previous network node can select a new network node and can transfer instructions to the newly selected network node. For example, when network node 328 de-establishes secure communication link 350, the termination can be detected by network node 326. According to the instructions on detecting network node 326, network node 326 can select a new network node 502 and can transfer instructions to network node 502.

In operation 624, the newly selected network node can establish a secure communication link with the previous network node. For example, according to the received instructions, network node 502 can establish a secure network connection with network node 326 over communication link 504.

When the secure communication link is established between network node 502 and network node 326, a secure communication link between network node 502 and controller node 302 can be established (operation 626). The newly established secure communication link between controller node 302 and network node 502 within the secure communication links between controller node 302 and network node 320, network nodes 320 and 322, network nodes 322 and 324, network nodes 324 and 326, and network nodes 328 and 402, can comprise a new egress network path. Thereafter, research can be conducted on target 306 through network node 502 over communication link 506. In an embodiment, network node 502 can be randomly selected by network node 326 according to the instructions on network node 326. Network node 502 can be in a designated network domain, or it can be in a specified geographic location or region.

Figure 7:
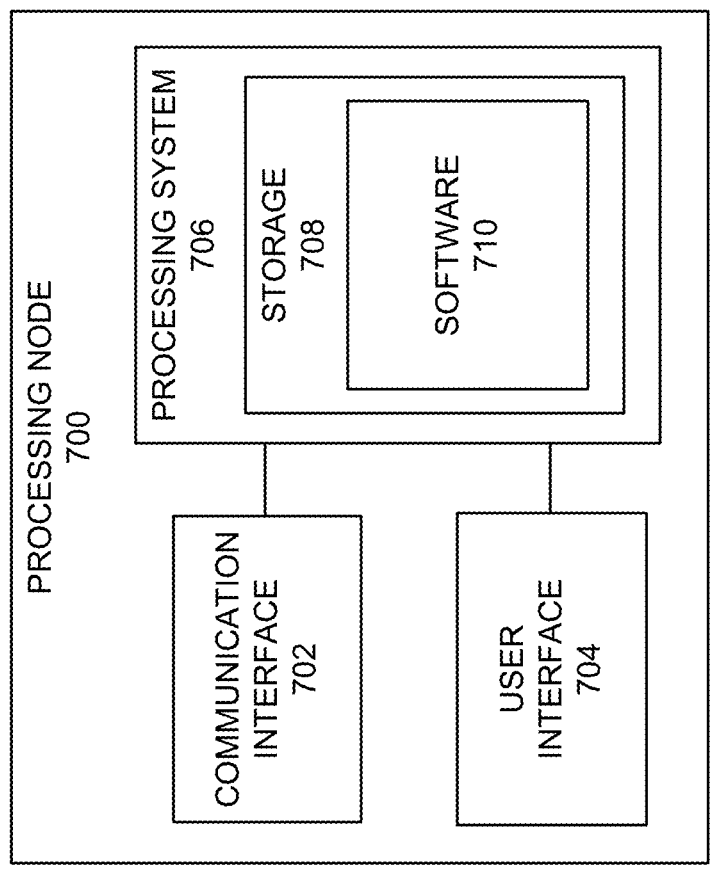
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include controller node 102 and controller node 302. Processing node 700 can also be an adjunct or component of a network element, or the functions and features of processing node 700 can be distributed among two or more network elements.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of network path generation, comprising:
transferring first instructions from a first network element to a second network element instructing the second network element to establish a first secure communication link with the first network element and to transfer instructions from the second network element to a third network element, wherein the second network element is randomly selected by the first network element, and the second network element is not preconfigured to communicate with the first network element when the second network element is selected by the first network element;

transferring, according to the first instructions, second instructions from the second network element to the third network element instructing the third network element to establish a second secure communication link with the second network element, wherein third network element is randomly selected by the second network element, and the third network element is not preconfigured to communicate with the second network element when the third network element is selected by the second network element; and establishing within the first secure communication link and the second secure communication link a third secure communication link between the first network element and the third network element.

2. The method of claim 1, wherein the third network element is randomly selected within a designated network region by the second network element.

3. The method of claim 1, further comprising:
monitoring each of the second and third network elements for an indication of intrusion;
de-establishing the first secure communication link in response to detecting the indication of intrusion at the second network element; and
transferring third instructions from the first network element to a fourth network element instructing the fourth network element to establish a third secure communication link with the first network element.

4. The method of claim 1, further comprising deleting a portion of the first instructions from the second network element when the first secure communication link is established, and deleting a portion of the second instructions from the third network element when the second secure communication link is established.

5. The method of claim 1, wherein the first instructions transferred from the first network element to the second network element comprise a latency threshold, and wherein a communication latency between the second network element and the third network element is below the latency threshold.

6. The method of claim 1, wherein the second network element is selected by the first network element in response to determining that a communication latency between the first network element and the second network element is below a latency threshold.

7. A method of network path generation, comprising:
transferring first instructions from a controller node to a first network node instructing the first network node to establish a first secure communication link with the controller node and to transfer instructions from the first network node to a second network node, wherein the first network node is randomly selected by the controller node, and the first network node is not preconfigured to communicate with the controller node when the first network node is selected by the controller node;

transferring, according to the first instructions, second instructions from the first network node to the second network node instructing the second network node to establish a second secure communication link with the first network node and to transfer instructions from the second network node to a third network node, wherein the second network node is randomly selected by the first network node, and the second network node is not preconfigured to communicate with the first network node when the second network node is selected by the first network node;

transferring, according to the second instructions, third instructions from the second network node to the third network node instructing the third network node to establish a third secure communication link with the second network node, wherein the third network node is randomly selected by the second network node, and the third network node is not preconfigured to communicate with the second network node when the third network node is selected by the second network node; and establishing within the first secure communication link, the second secure communication link, and the third secure communication link an egress communication link between the controller node and the third network node.

8. The method of claim 7, further comprising:
de-establishing the first, second and third secure communication links after a predetermined period of time.

9. The method of claim 8, further comprising:
deleting the instructions from the first, second and third network nodes, respectively, when each of the first, second and third communication links are de-established.

10. The method of claim 9, wherein the controller node further comprises a non-attributable network node.

11. The method of claim 9, wherein the controller node further comprises a virtual user environment.

12. The method of claim 7, further comprising:
transferring fourth instructions from the controller node to a fourth network node instructing the fourth network node to establish a fourth secure communication link with the controller node and to transfer instructions from the fourth network node to a fifth network node, wherein the fourth network node is randomly selected by the controller node, and the fourth network node is not preconfigured to communicate with the controller node when the fourth network node is selected by the controller node;

transferring, according to the fourth instructions, fifth instructions from the fourth network node to the fifth network node instructing the fifth network node to establish a fifth secure communication link with the fourth network node and to transfer instructions from the fifth network node to a sixth network node, wherein the fifth network node is randomly selected by the fourth network node, and the fifth network node is not preconfigured to communicate with the fourth network node when the fifth network node is selected by the fourth network node;

transferring, according to the instructions, sixth instructions from the fifth network node to the sixth network node instructing the sixth network node to establish a sixth secure communication link with the fifth network node, wherein the sixth network node is randomly selected by the fifth network node, and the sixth network node is not preconfigured to communicate with the fifth network node when the sixth network node is selected by the fifth network node; and establishing within the fourth secure communication link, the fifth communication link, and the sixth secure communication link an ingress communication link between the controller node and the sixth network node.

13. The method of claim 12, further comprising:
receiving at the controller node an instruction from a source network element along the ingress communication link.

14. The method of claim 13, wherein the source network element communicates with the sixth network element via the ingress communication link.

15. The method of claim 13, further comprising:
performing research on a target network element along the egress communication link based on the instruction received from the source via the ingress communication link.

16. The method of claim 15, wherein third network element of the egress communication link communicates with the target network element.

17. A non-transitory processor-readable storage medium having stored thereon processor-executable codes configured to cause a processor of a processing node to perform operations comprising:
transferring first instructions from a controller node to a first network node instructing the first network node to establish a first secure communication link with the controller node and to transfer instructions from the first network node to a second network node, wherein the first network node is randomly selected by the controller node, and the first network node is not preconfigured to communicate with the controller node when the first network node is selected by the controller node;

transferring, according to the first instructions, second instructions from the first network node to the second network node instructing the second network node to establish a second secure communication link with the first network node and to transfer instructions from the second network node to a third network node, wherein the second network node is randomly selected by the first network node, and the second network node is not preconfigured to communicate with the first network node when the second network node is selected by the first network node;

transferring, according to the second instructions, third instructions from the second network node to the third network node instructing the third network node to establish a third secure communication link with the second network node, wherein the third network node is randomly selected by the second network node, and the third network node is not preconfigured to communicate with the second network node when the third network node is selected by the second network node;

establishing within the first secure communication link, the second secure communication link, and the third secure communication link an egress communication link between the controller node and the third network node;

monitoring each of the second and third network nodes for an indication of intrusion;

de-establishing the second secure communication link in response to detecting the indication of intrusion at the second network node; and transferring, according to the first instructions, fourth instructions from the first network node to a fourth network node instructing the fourth network node to establish a fourth secure communication link with the first network node.

18. The non-transitory processor-readable storage medium of claim 17, wherein the stored processor-executable software instructions are configured to cause a processor to perform operations further comprising:
  deleting at least a portion of the first instructions from the first network node when the first secure communication link is established, at least a portion of the second instructions from the second network node when the second secure communication link is established, and at least a portion of the third instructions portion of the instructions from the third network node when the third secure communication link is established.

* * * * *